UNITED STATES PATENT OFFICE.

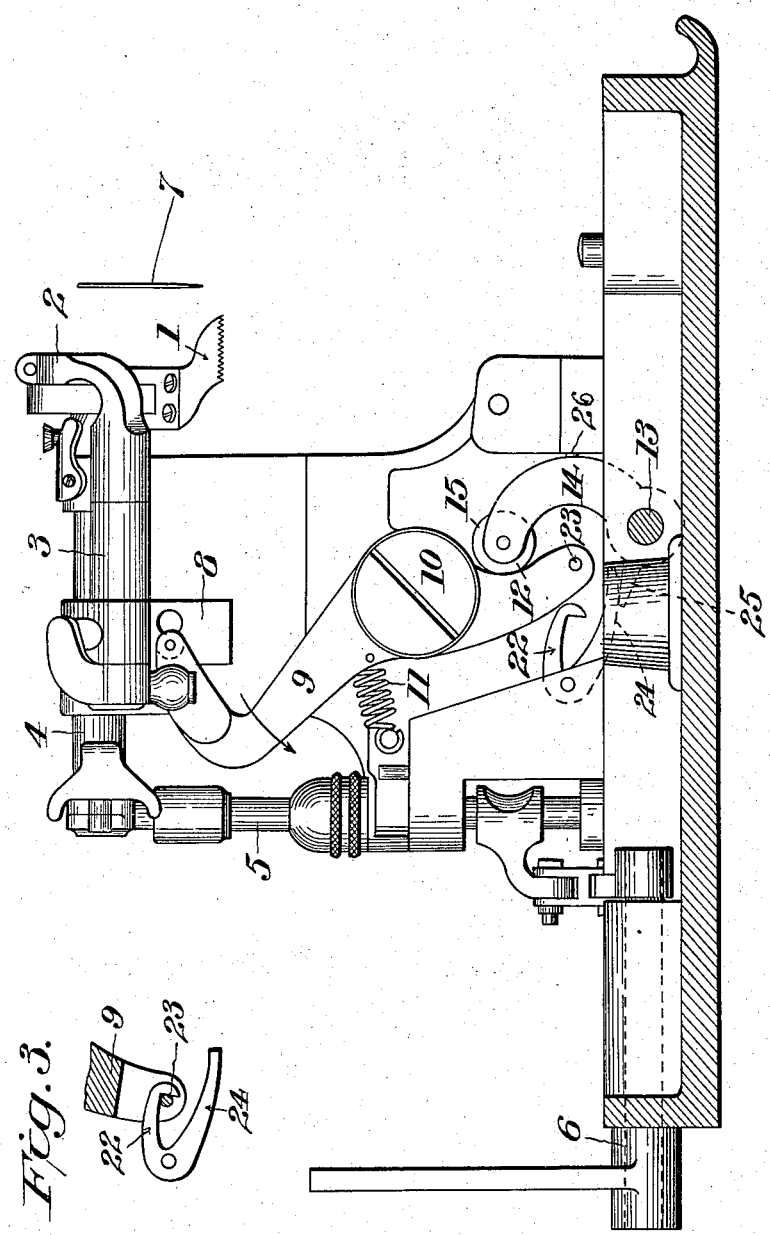

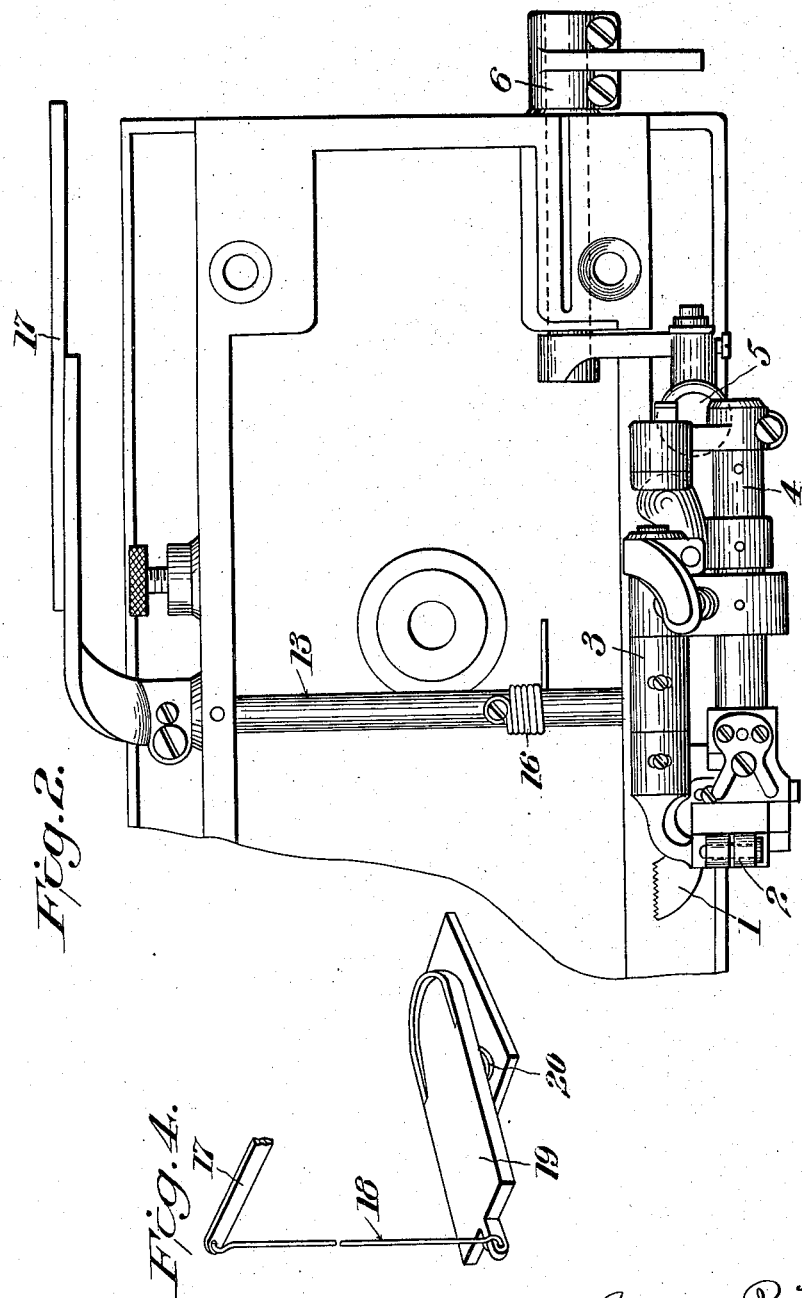

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

CONTROLLING DEVICE FOR OPERATING IMPLEMENTS IN SEWING-MACHINES.

1,157,170.   Specification of Letters Patent.   Patented Oct. 19, 1915.

Application filed November 11, 1911. Serial No. 659,747.

*To all whom it may concern:*

Be it known that I, JAMES R. MOFFATT, a citizen of the United States, residing at Chicago, in the county of Cook, State of Illinois, have invented certain new and useful Improvements in Controlling Devices for Operating Implements in Sewing-Machines, of which the following is a description, reference being had to the accompanying drawing and to the letters and figures of reference marked thereon.

The invention relates to new and useful improvements in controlling devices for an operating implement of a sewing machine or the like adapted to operate upon fabric and to be shifted from effective to ineffective position.

An object of the invention is to provide treadle-controlled devices for throwing the operating device or implement into or out of active position.

A further object of the invention is to provide a locking mechanism for holding the operating device or implement in its active position.

In the drawings which show by way of illustration one embodiment of the invention,—Figure 1 is a view partly in section and partly in side elevation, showing my improved devices for controlling the position of the operating device or implement; Fig. 2 is a plan view of the same; Fig. 3 is a detail partly in section, showing the locking latch for holding the shifting lever; and Fig. 4 is a view on a reduced scale, showing the treadle for operating the shifting lever.

I have shown my improved shifting device as applied to a ruffling implement used in connection with a sewing machine. In doing certain classes of stitching, it is desired to use a ruffler which may be moved laterally and positioned in front of the needle for stitching, and which may be moved from said operative or effective position in the opposite direction to an inoperative or ineffective position, so as to give ready access to the material being stitched, and to remove the ruffler from all contact with the material, or interference with the movement of the material. My invention, however, is not restricted to the shifting of an implement of the above character, as it is often desired to shift implements of different characters, so as to render the same inoperative or ineffective, or for other purposes.

In the shifting of an implement where the operator has other devices to control, it is sometimes desirable to provide automatic means for shifting the implement in one direction and a treadle for moving the implement in the other direction. One feature of applicant's invention is to construct devices for shifting the implement herein shown automatically in one direction, while the shifting of the implement in the opposite direction is controlled by a treadle. In this type of mechanism it is often a strain upon the operator to hold the treadle depressed against the action of the means for automatically throwing the implement out of action. Another phase of my invention consists in providing a locking latch, which will hold the implement in operative position against the action of the shifting means, which locking latch may be controlled by the treadle; and thus the entire strain of holding the implement in active position is relieved from the operator.

Referring to the drawings, wherein one embodiment of the invention is illustrated, I have provided an implement 1 which is carried by an arm 2 mounted on a support 3. This implement is oscillated by a shaft extending through a sleeve 4 and connected in any suitable way with the supporting member for the implement. The shaft is in turn oscillated by a reciprocating rod 5, which is connected to a rock shaft 6 that may be oscillated in any desired way. The implement 1 is shifted laterally relative to a needle 7, in order to render the same effective or ineffective. When the implement is placed in front of the needle, it is in position for action upon the material, and upon the oscillation of the rock shaft 6 the implement may be vibrated back and forth. The sleeve 4 and the support 3 are connected by a bracket 8, and said sleeve and support are preferably mounted so that they may slide longitudinally, so as to move the implement into operative or inoperative position. The bracket 8 is moved longitudinally by a shifting lever 9, which is pivoted at 10 to a suitable supporting frame.

A spring 11 is connected at one end to said shifting lever 9, and at its other end to the frame. This spring will operate to shift the lever 9 in the direction of the arrow in Fig. 1. The movement of the shifting lever through the action of the spring, will carry the implement 1 away from the needle 7 and hold the same in its inoperative position.

As a means for moving the shifting lever in the opposite direction to carry the implement into active position, I have formed the shifting lever 9 with a downwardly projecting arm 12. Mounted on the frame is a rock shaft 13, carrying an arm 14 in which is mounted a roller 15, adapted to engage the arm 12. The rock shaft 13 is provided with a spring 16, which normally turns the rock shaft so as to hold the roller 15 moved away from the arm 12.

The rock shaft 13 carries an arm 17 which is connected by a suitable rod 18 to a treadle 19. The treadle is pivoted upon a base of any desired construction, and a spring 20 normally operates to lift the front end of the treadle.

From the above description, it will be noted that when the treadle is depressed, the arm 17 will be lowered, oscillating the rock shaft 13 so as to carry the roller 15 into contact with the arm 12 and move the shifting lever against the action of the spring 11. This movement of the shifting lever will carry the operating implement into operative position. When the treadle is released, the spring will at once throw the implement into inoperative or inactive position.

From this construction it will be seen that the operator is obliged to hold the treadle depressed against the action of the spring 11. As a means for locking the shifting lever so as to relieve the operator from this strain, I have provided a latch, which is pivoted to the frame and carries a locking finger 22 adapted to engage a stud 23 on the lower end of the arm 12. The end of the finger 22 is preferably cam-shaped, so that said stud will ride over said cam-shaped end and drop behind the shoulder of the locking finger. Said latch carries a second arm 24, which is so positioned as to be engaged by a lug 25 on the arm 14. When the shifting lever is thrown against the tension of the spring 11, so as to bring the implement into operative position, the latch will engage the stud 23 and hold the parts locked in this position. The lug 25 moves away from the arm 24 of the latch as the rock shaft is swung by the treadle to shift the lever 9. This latch will, therefore, hold the shifting lever against the tension of the spring 11 and relieve the operator from all strain except the necessary pressure to hold the treadle down against the tension of the lifting spring for the treadle and the spring 16 for the rock shaft 13.

When it is desired to render the implement inactive, the operator allows the treadle to raise sufficiently for the lug 25 to engage the locking latch and lift the same from engagement with the locking stud 23. This frees the shifting lever, so that the spring 11 may at once throw the implement to inactive position.

The lug 25 has sufficient movement before releasing the latch 22 to place the roller 15 on the arm 14 out of the way of the movement of the lever by the spring 11. The locking finger 22 when out of engagement with the pin 23 is always in engagement with the lug 25. The movement of the arm 14 is limited by the stop 26 engaging a lug on the supporting base.

It is obvious, as above noted, that my shifting lever and locking device may be applied to various devices such as a presser foot for a sewing machine or the like, wherein it is desired to automatically throw the same in one direction and to lock the same against the action of said automatic shifting means.

It is obvious that minor changes in the details of construction and arrangement of parts may be made, without departing from the spirit of my invention, as set forth in the appended claims.

Having thus described my invention, what I claim as new and desire to secure by Letters Patent, is:—

1. In a sewing machine, the combination of an operating implement adapted to be shifted from one position to another, means for shifting said implement including a lever, a spring for moving the lever in one direction, manually operated means for moving the lever in the opposite direction, a movable locking device for holding said lever from movement by said spring, and means operated upon the return movement of said manually operated means for releasing said movable locking device.

2. In a sewing machine, the combination of an operating implement adapted to be shifted from one position to another, means for shifting said implement including a lever, a spring for moving the lever in one direction, treadle controlled means for moving the lever in the opposite direction, a latch for locking said lever from movement by said spring, and means operated upon the return movement of the treadle for releasing said latch.

3. In a sewing machine, the combination of an implement adapted to be shifted from one position to another, means for shifting the same including a shifting lever, a spring for moving said lever in one direction, a rock lever having an arm for engaging said shifting lever for moving the same against the action of the spring, a latch for holding said shifting lever against movement by the spring, and devices operated upon the return movement of the rock lever for releasing said latch.

4. In a sewing machine, the combination of an implement adapted to be shifted from one position to another, means for shifting the same including a shifting lever, a spring for moving said lever in one direction, a rock lever having an arm for engaging said shifting lever for moving the same against the action of the spring, a latch for holding said shifting lever against movement by the spring, and devices operated upon the return movement of the rock lever for releasing said latch, said devices including a treadle for moving the rock lever to shift the implement against the action of the spring, and a spring for returning the treadle to release the latch.

In testimony whereof I affix my signature, in presence of two witnesses.

JAMES R. MOFFATT.

Witnesses:
C. McNeil,
A. B. Clothier.

Copies of this patent may be obtained for five cents each, by addressing the "Commissioner of Patents, Washington, D. C."